United States Patent
Fujii et al.

(10) Patent No.: US 9,112,436 B2
(45) Date of Patent: Aug. 18, 2015

(54) SYSTEM FOR CONTROLLING CONTROLLED VARIABLE OF ROTARY MACHINE

(71) Applicant: DENSO CORPORATION, Kariya, Aichi-pref. (JP)

(72) Inventors: Kiyoshi Fujii, Kasugai (JP); Akimasa Osaki, Chiryu (JP); Hideki Kabune, Nagoya (JP); Koichi Nakamura, Toyota (JP)

(73) Assignee: DENSO CORPORATION, Kariya (JP)

( * ) Notice: Subject to any disclaimer, the term of this patent is extended or adjusted under 35 U.S.C. 154(b) by 88 days.

(21) Appl. No.: 13/867,367

(22) Filed: Apr. 22, 2013

(65) Prior Publication Data

US 2013/0278200 A1 Oct. 24, 2013

(30) Foreign Application Priority Data

Apr. 20, 2012 (JP) ................................. 2012-096197

(51) Int. Cl.
| | | |
|---|---|---|
| H02P 6/14 | (2006.01) | |
| H02P 6/00 | (2006.01) | |
| H02P 6/10 | (2006.01) | |
| H02P 21/06 | (2006.01) | |

(52) U.S. Cl.
CPC ............. *H02P 6/002* (2013.01); *H02P 6/10* (2013.01); *H02P 21/06* (2013.01)

(58) Field of Classification Search
USPC .............. 318/400.01–400.08, 400.26, 400.32
See application file for complete search history.

(56) References Cited

U.S. PATENT DOCUMENTS

| | | | |
|---|---|---|---|
| 2008/0246426 A1 | 10/2008 | Aoki et al. | |
| 2009/0284194 A1* | 11/2009 | Forte ........................ | 318/400.02 |
| 2011/0241579 A1* | 10/2011 | Kimpara et al. ......... | 318/400.02 |
| 2011/0298403 A1* | 12/2011 | Yamamoto et al. ...... | 318/400.02 |
| 2012/0206077 A1* | 8/2012 | Yoneshima et al. ...... | 318/400.33 |
| 2012/0319629 A1* | 12/2012 | Takaki et al. ............ | 318/400.02 |

FOREIGN PATENT DOCUMENTS

| | | | |
|---|---|---|---|
| JP | 05-252795 | | 9/1993 |
| JP | 05252795 A | * | 9/1993 |
| JP | 2004-072931 | | 3/2004 |
| JP | 2008-228476 | | 9/2008 |

(Continued)

OTHER PUBLICATIONS

Computer translation of JP 05252795, pp. 1-7, Oct. 7, 2014.*

(Continued)

*Primary Examiner* — Rina Duda
*Assistant Examiner* — Bickey Dhakal
(74) *Attorney, Agent, or Firm* — Nixon & Vanderhye P.C.

(57) ABSTRACT

In a system for controlling a controlled variable of a rotary machine having plural-phase input terminals of the rotary machine in which plural-phase AC power is applied from an AC power applying module to the input terminals, a command-voltage setting module sets, based on a request value for the controlled variable, plural-phase AC command voltages for the plural-phase AC power as a feedforward manipulated variable. A current obtaining module obtains plural-phase AC currents flowing in the respective plural-phase input terminals of the rotary machine. An amplitude correcting module corrects the amplitude of at least one of the plural-phase AC command voltages based on the magnitudes of the plural-phase AC currents.

12 Claims, 6 Drawing Sheets

(56) References Cited

FOREIGN PATENT DOCUMENTS

| JP | 2008-278736 | 11/2008 |
|---|---|---|
| JP | 2010-136584 | 6/2010 |
| JP | 2010-148199 | 7/2010 |
| JP | 2011-200103 | 10/2011 |

OTHER PUBLICATIONS

Office Action (2 pages) dated Mar. 11, 2014, issued in corresponding Japanese Application No. 2012-096197 and English translation (2 pages).

* cited by examiner

| SWITCHING MODE | ON STATE | | | IDC |
|---|---|---|---|---|
| 0 | Sun | Svn | Swn | |
| 1 | Sup | Svn | Swn | iu |
| 2 | Sup | Svp | Swn | -iw |
| 3 | Sun | Svp | Swn | iv |
| 4 | Sun | Svp | Swp | -iu |
| 5 | Sun | Svn | Swp | iw |
| 6 | Sup | Svn | Swp | -iv |
| 7 | Sup | Svp | Swp | |

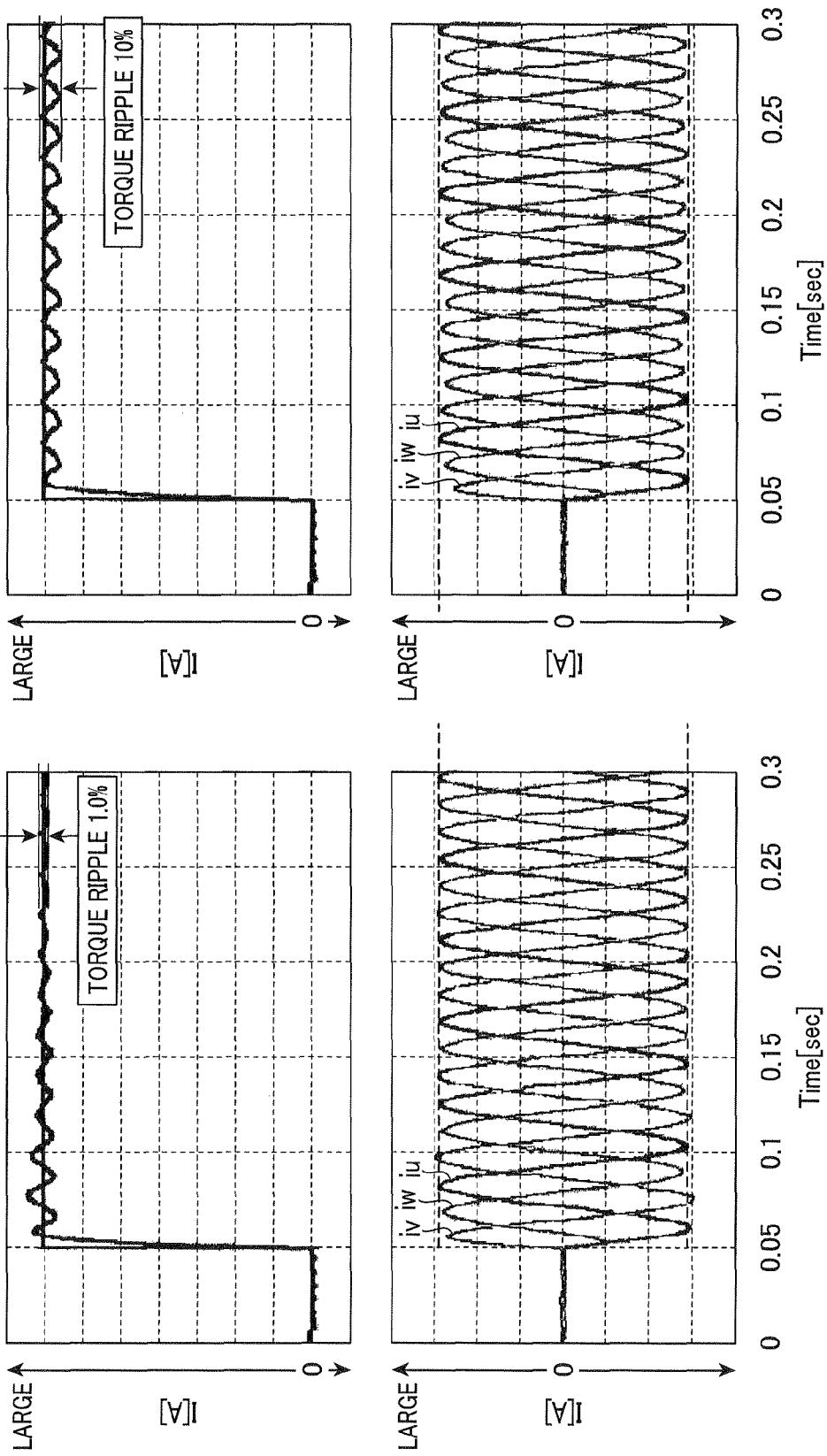

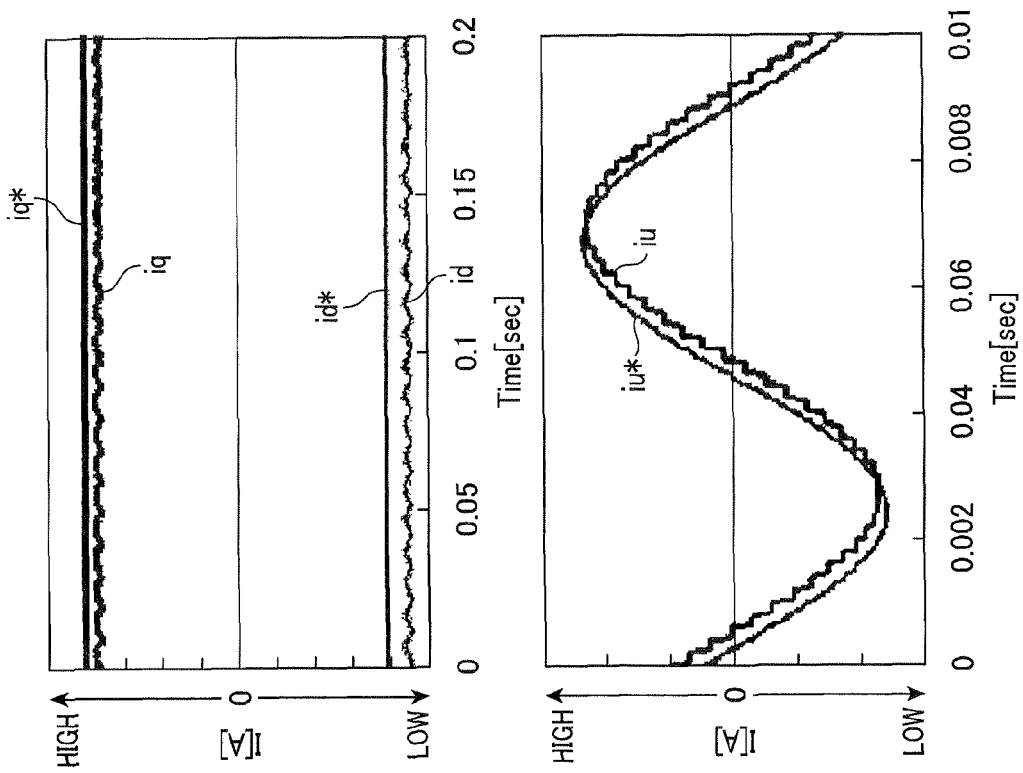
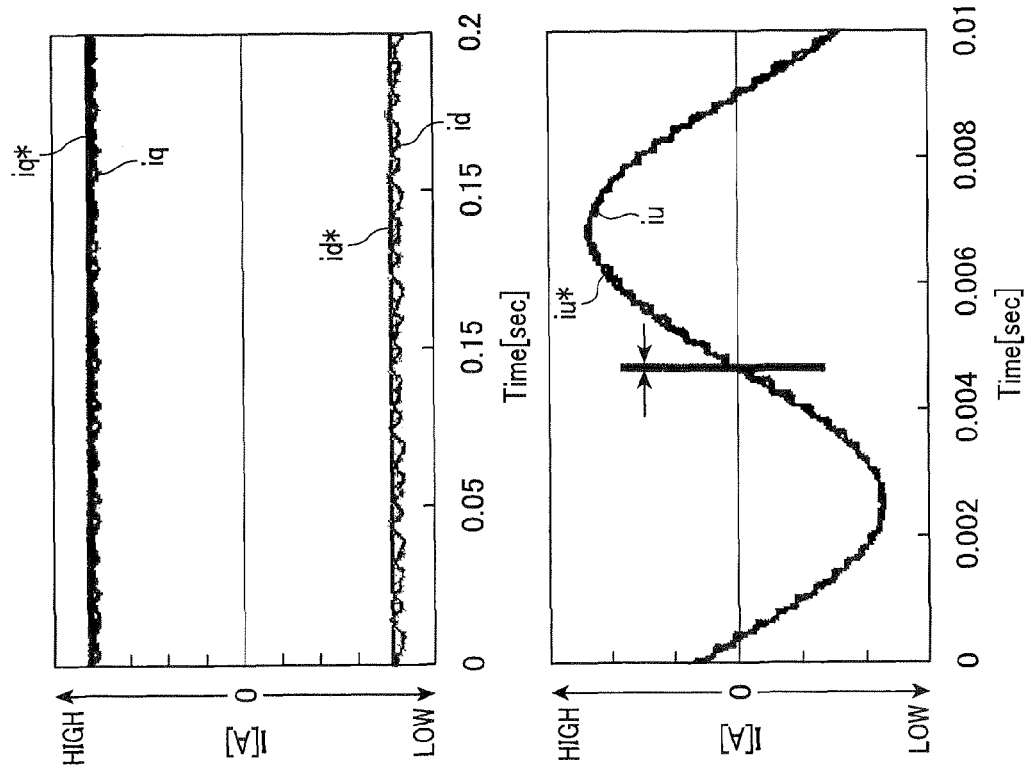

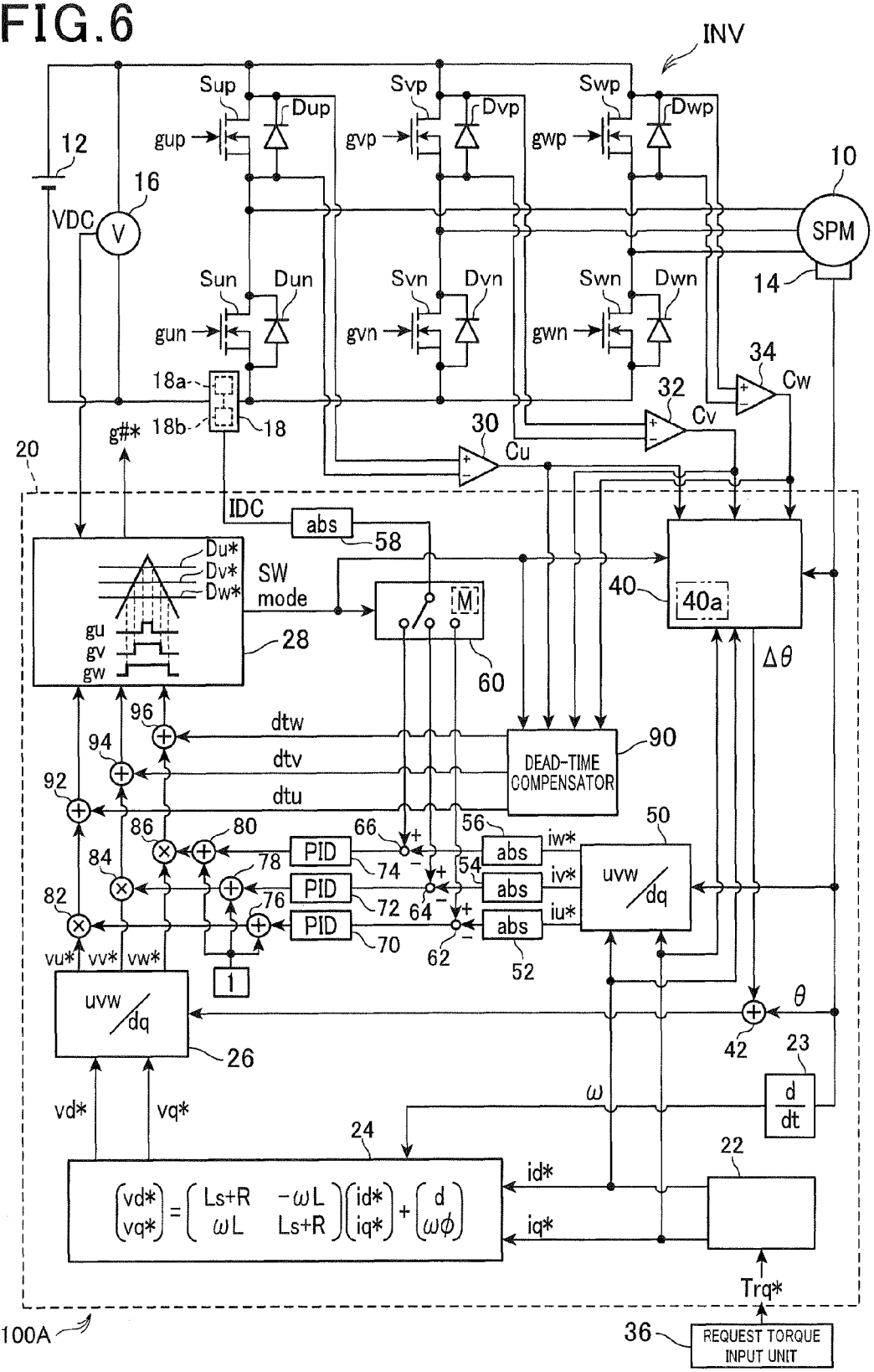

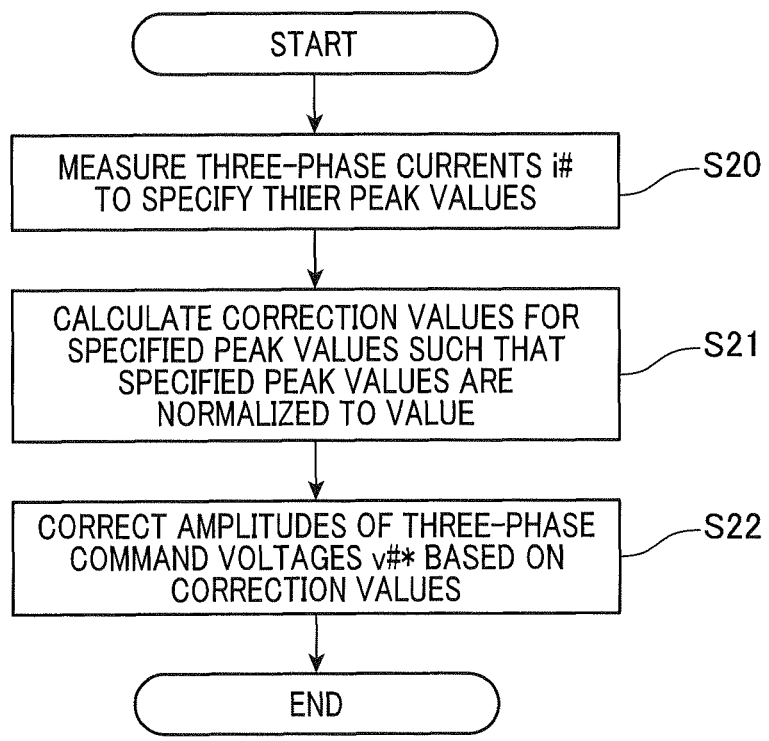

SYSTEM FOR CONTROLLING CONTROLLED VARIABLE OF ROTARY MACHINE

CROSS REFERENCE TO RELATED APPLICATIONS

This application is based on and claims the benefit of priority from Japanese Patent Application 2012-096197 filed on Apr. 20, 2012, the disclosure of which is incorporated in its entirety by reference.

TECHNICAL FIELD

The present disclosure relates to systems for controlling a controlled variable of a rotary machine; the controlled variable includes, for example, at least one of torque of the rotary machine and the rotational speed thereof.

BACKGROUND

An example of various types of control systems for rotary machines is disclosed in Japanese Patent Application Publication No. 2008-228476. The Patent Application Publication discloses a control system for a three-phase motor as an example of rotary machines. The control system includes an inverter for converting DC (Direct Current) power to AC (Alternating Current) power. The control system is designed to correct the output voltage of the inverter, which is proportional to the rotational speed of the three-phase motor, such that the peak value of a current, which flows in the three-phase motor and is fed back to the control system, becomes a predetermined value.

SUMMARY

The aforementioned control system performs feedback control based on the peak value of a current, which flows in the three-phase motor and is fed back to the aforementioned control system. Let us consider a case where there are variations in the amplitudes of the respective phase currents flowing in the three-phase motor due to, for example, the variations in machine parameters, such as inductances and magnetic flux linkages, for the respective phases of the three-phase motor. In this case, the aforementioned control system cannot correct the variations in the amplitudes of the respective phase currents flowing in the three-phase motor. This may result in torque ripples in the three-phase motor.

In view of the circumstances set forth above, one aspect of the present disclosure seeks to provide systems for controlling a controlled variable of a rotary machine, which are capable of addressing such a problem set forth above.

Specifically, an alternative aspect of the present disclosure aims to provide such systems each capable of reducing the variations in the amplitudes of respective phase currents flowing in a rotary machine to thereby reduce torque ripples in the rotary machine.

According to an exemplary aspect of the present disclosure, there is provided a system for controlling a controlled variable of a rotary machine having plural-phase input terminals of the rotary machine in which plural-phase AC power is applied from an AC power applying module to the input terminals. The system includes a command-voltage setting module configured to set, based on a request value for the controlled variable, plural-phase AC command voltages for the plural-phase AC power as a feedforward manipulated variable. The system includes a current obtaining module configured to obtain plural-phase AC currents flowing in the respective plural-phase input terminals of the rotary machine. The system includes an amplitude correcting module configured to correct an amplitude of at least one of the plural-phase AC command voltages based on magnitudes of the plural-phase AC currents obtained by the current obtaining module.

In the exemplary aspect of the present disclosure, the amplitude correcting module corrects the amplitude of at least one of the plural-phase AC command voltages based on the magnitudes of the plural-phase AC currents obtained by the current obtaining module. The correction of the amplitude of at least one of the plural-phase AC command voltages makes it possible to reduce the variations in the amplitudes of the plural-phase AC currents, thus reducing torque ripples of the rotary machine due to the variations in the amplitudes of the plural-phase AC currents.

The above and/or other features, and/or advantages of various aspects of the present disclosure will be further appreciated in view of the following description in conjunction with the accompanying drawings. Various aspects of the present disclosure can include or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIG. 4A is a graph schematically illustrating how three-phase currents change with time, and how torque ripples appear according to the first embodiment;

FIG. 4B is a graph schematically illustrating how three-phase currents change with time, and how torque ripples appear according to a comparative example in which three-phase command voltages output from a command voltage setter illustrated in FIG. 1 are used while their amplitudes and phases are uncorrected;

FIG. 5A is a graph schematically illustrating how command d- and q-axis currents and corresponding actual d- and q-axis currents change with time, and how a command U-phase current and a corresponding actual U-phase current change with time according to the first embodiment;

FIG. 5B is a graph schematically illustrating how command d- and q-axis currents and corresponding actual d- and q-axis currents change with time, and how a command U-phase current and a corresponding actual U-phase current change with time according to the comparative example;

FIG. 6 is a circuit diagram of a control system according to a second embodiment of the present disclosure; and FIG. 7 is a flowchart schematically illustrating an amplitude correcting task that can be carried out by the controller according to a modification of each of the first and second embodiments.

DETAILED DESCRIPTION OF EMBODIMENT

Figure 1:
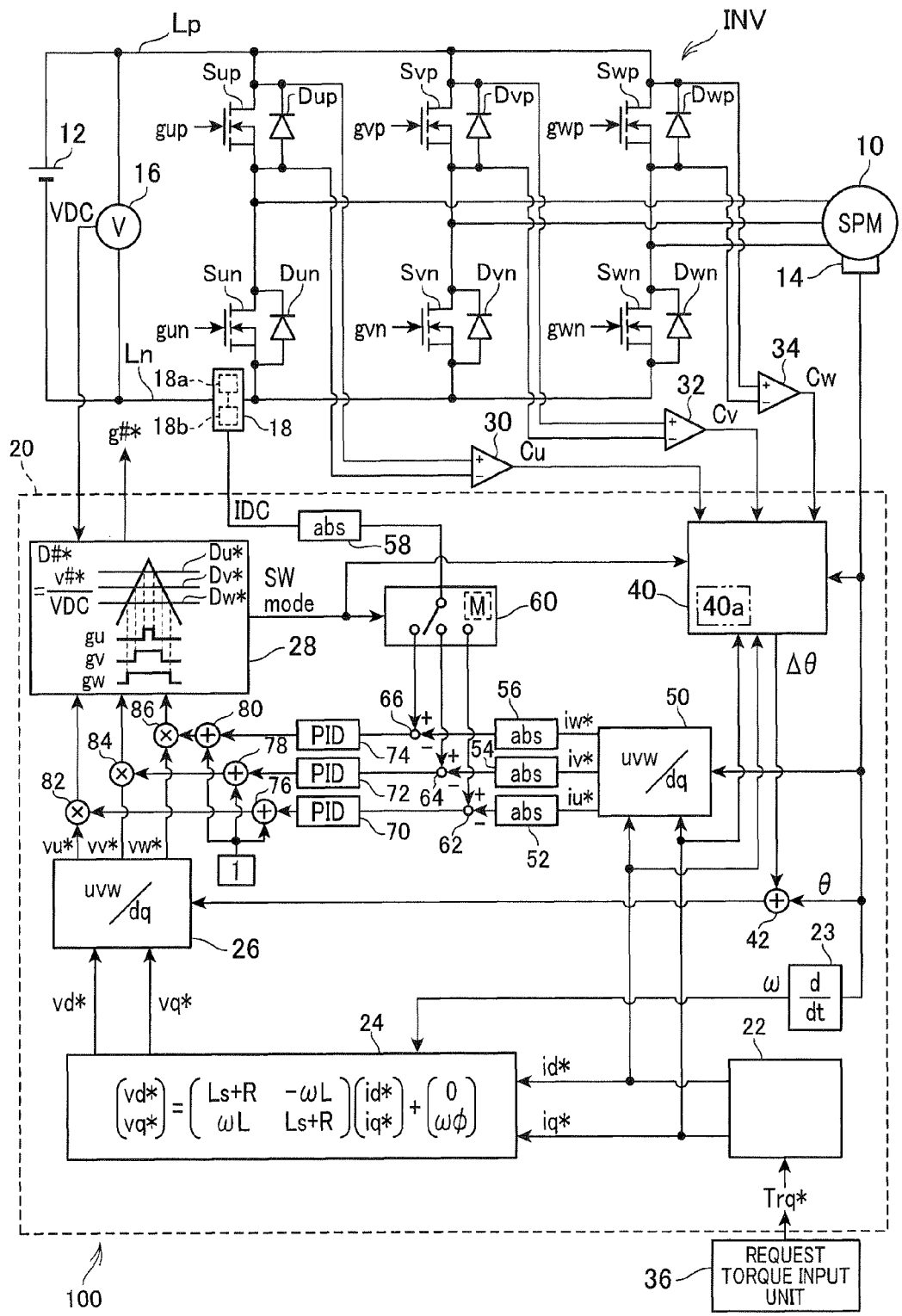
FIG. 1 is a circuit diagram of a control system according to a first embodiment of the present disclosure.

Embodiments of the present disclosure will be described hereinafter with reference to the accompanying drawings. In the embodiments, redundant descriptions of like parts between the embodiments, to which like reference characters are assigned, are omitted or simplified.

First Embodiment

Referring to FIG. 1, there is illustrated a system 100 for controlling a motor 10 as an example of rotary machines installed in, for example, an electric power steering system for motor vehicles according to the first embodiment. In the first embodiment, the motor 10 is a three-phase synchronous motor. More specifically, an SPMSM (Surface Permanent Magnet Synchronous Motor) is used in the first embodiment.

The control system 100 is equipped with an inverter INV, a battery 12, and a controller 20.

Specifically, the motor 10 and the battery 12 can establish electrical connection therebetween via the inverter INV.

For example, the motor 10 is provided with an annular rotor having an iron rotor core. The rotor core is coupled to an assist mechanism of the electric power steering system; the assist mechanism is mechanically coupled to a steering shaft of the motor vehicle to which a steering wheel is coupled.

Specifically, the rotor core of the rotor is provided at its outer circumferential surface with at least one pair of permanent magnets. The permanent magnets of the at least one pair are symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being $\pi/2$ radian in electrical angle leading with respect to a corresponding d-axis during rotation of the rotor. In other words, the q-axis is electromagnetically orthogonal to the d-axis.

The d and q axes constitute a d-q coordinate system (rotating coordinate system) defined in the rotor of the motor 10.

An inductance L in the d-axis is equal to an inductance L in the q-axis because the permanent magnets have a magnetic permeability constant equal to that of air. This type of motors are called "non-salient pole motors".

The motor 10 is also provided with a stator. The stator includes a stator core with, for example, an annular shape in its lateral cross section. The stator core is disposed, for example, around the outer periphery of the rotor core such that the inner periphery of the stator core is opposite to the outer periphery of the rotor core with a predetermined air gap.

The stator also includes a set of three-phase windings (armature windings) wound in the stator such that the U-, V-, and W-phase windings are shifted by an electric angle of, for example, $2\pi/3$ radian in phase from each other.

For example, the three-phase armature windings (U-, V-, and W-phase windings) each have one end connected to a common junction (neutral point) and the other end to a separate terminal in, for example, a star-configuration.

The motor 10 is operative to receive at its three-phase windings three-phase currents to generate a rotating magnetic flux; this allows the rotor to turn based on magnetic attractive force between the rotating magnetic flux and a magnetic flux of the rotor.

The inverter INV serves as, for example, a circuit configured to output an AC (Alternating Current) voltage to be applied to the motor 10. Specifically the inverter INV is designed as a three-phase inverter. The inverter INV is provided with a first pair of series-connected high- and low-side (upper- and lower-arm) switching elements Sup and Sun, a second pair of series-connected high- and low-side (upper- and lower-arm) switching elements Svp and Svn, and a third pair of series-connected high- and low-side (upper- and lower-arm) switching elements Swp and Swn. The inverter INV is also provided with flywheel diodes D#* (#=u, v, w, *=p, n) electrically connected in antiparallel to the corresponding switching elements S#* (#=u, v, w, *=p, n), respectively.

In the first embodiment, as the switching elements S#* (#=u, v, w, *=p, n), power MOSFETs are respectively used. When power MOSFETs are used as the switching elements S#* (#=u, v, w, *=p, n), intrinsic diodes of the power MOSFETs can be used as the flywheel diodes, thus eliminating the flywheel diodes. IGBTs can be used as the switching elements S#* (#=u, v, w, *=p, n).

The first to third pairs of switching elements are parallely connected to each other in bridge configuration.

A connecting point through which the switching elements Sup and Sun of the first pair are connected to each other in series is connected to an output lead extending from the separate terminal of the U-phase winding. Similarly, a connecting point through which the switching elements Svp and Svn of the second pair are connected to each other in series is connected to an output lead extending from the separate end of the V-phase winding. Moreover, a connecting point through which the switching elements Swp and Swn of the third pair are connected to each other in series is connected to an output lead extending from the separate end of the W-phase winding. The separate terminals of the U-, V-, and W-phase windings of the motor 10 serve as AC power input terminals of the motor 10 to which three-phase AC power are input from the inverter INV.

One end of the series-connected switching elements of each of the first, second, and third pairs, such as the drain of a corresponding high-side switching element, serves as a positive input terminal of the inverter INV for a corresponding one phase of the motor 10. The positive input terminals of the inverter INV for the respective phases of the motor 10 are connected to the positive terminal of the battery 12 via a positive DC bus line Lp. The other end of the series-connected switching elements of each of the first, second, and third pairs, such as the source of a corresponding low-side switching element, serves as a negative input terminal of the inverter INV for a corresponding one phase of the motor 10. The negative input terminals of the inverter INV for the respective phases of the motor 10 are connected to the negative terminal of the battery 12 via a negative DC bus line Ln.

The control system 100 is equipped with, as means for detecting operating conditions of each of the motor 10 and the inverter INV, a rotational angle sensor 14, a voltage sensor 16, a current sensor 18, and comparators 30, 32, and 34.

The rotational angle sensor 14 is communicable with the controller 20, and operative to measure a rotational angle, i.e. an electric angle, $\theta$ of the motor 10 (the d-axis of the rotor), and output the measured rotational angle $\theta$ of the motor 10 to the controller 20. In other words, the d-q coordinate system defined in the rotor of the motor 10 is rotated by the rotational angle $\theta$ relative to a three-phase stationary coordinate system defined in the stator. In the first embodiment, the d-axis of the rotor of the motor 10 is rotated by the rotational angle θ relative to the U-phase winding of the stator, i.e. the U-phase axis of the three-phase stationary coordinate system defined in the stator. The three-phase stationary coordinate system will be referred to as a three-phase coordinate system.

The voltage sensor 16 is arranged to allow measurement of an input voltage (power supply voltage) VDC to be applied to the inverter INV. The voltage sensor 16 is communicable with the controller 20, and operative to send, to the controller 20, the inverter input voltage VDC to be applied to the inverter INV.

The current sensor 18 is communicable with the controller 20, and arranged to allow measurement of an instantaneous value of current flowing through at least one of the negative input terminals of the inverter INV connected to the negative DC bus line Ln. The current flowing through at least one of the negative input terminals of the inverter INV connected to the negative DC bus line Ln will be referred to as a bus current IDC hereinafter. The current sensor 18 is operative to output, to the controller 20, the instantaneous value of the bus current IDC flowing through at least one of the negative input terminals of the inverter INV connected to the negative DC bus line Ln.

For example, the current sensor 18 is comprised of a shunt resistor 18a and a potential difference detector 18b. The shunt resistor 18a is connected to the negative DC bus line Ln, and the potential difference detector 18b is operative to measure the potential difference across the shunt resistor 18a. The potential difference detector 18b is communicable with the controller 20, and output the measured potential difference to the controller 20.

Each of the comparators 30, 32, and 34 has a non-inverting input terminal, an inverting input terminal, and an output terminal. The non-inverting input terminal of each of the comparators 30, 32, and 34 is connected to the drain of a corresponding one of the switching elements S#p (#=u, v, w). The inverting input terminal of each of the comparators 30, 32, and 34 is connected to the source of a corresponding one of the switching elements S#p (#=u, v, w). The output terminal of each of the comparators 30, 32, and 34 is connected to the controller 20.

Each of the comparators 30, 32, and 34 serves as a polarity detecting module that:

compare the drain voltage with the source voltage of a corresponding one of the switching elements S#p; and measure the polarity of the potential difference between the drain and source of a corresponding one of the switching elements S#p using the compared results. Each of the comparators 32, 34, and 36 is also operative to send, as a corresponding one of output signals C#, the measured polarity of the potential difference between the drain and source of a corresponding one of the switching elements S#* to the controller 20.

Specifically, an output signal C# (#=u, v, or w) from the comparator 32 has a logical high level if the polarity of the potential difference between the drain and source of a switching element S#p is positive, i.e. the drain voltage is higher than the source voltage. In contrast, an output signal C# (#=u, v, or w) from the comparator 32 has a logical low level if the polarity of the potential difference between the drain and source of a switching element S#p is negative, i.e. the drain voltage is lower than the source voltage. The correspondence between the logical high or low level and the positive or negative polarity of an output signal C# (#=u, v, or w) can be reversed.

The controller 20 is connected to the gate, i.e. the control terminal, of each of the switching elements S#*, and to a request torque input unit 36 for inputting, to the controller 20, a request torque Trq* for the motor 10.

Specifically, the controller 20 is designed to receive the measured values output from the sensors 14 and 18, the output signals C# sent from the comparators 30, 32, and 34, and the request torque Trq*. Then, the controller 20 is designed to generate, based on the received pieces of data set forth above, drive signals g#* for individually driving the respective switching elements S#*, and supply the drive signals g#* to the gates of the respective switching elements S#*. This individually turns on or off the respective switching elements S#*, thus converting the inverter input voltage VDC into an AC voltage, and supplying the AC voltage to the motor 10 while controlling at least one controlled variable, such as output torque or the rotational speed, of the motor 10.

Each of the drive signals g*# has a predetermined duty cycle, i.e. a predetermined ratio of on duration to the total duration of each switching cycle for a corresponding one of the switching elements S*#. Specifically, the controller 20 is designed to complementarily turn on and off the high- and low-side switching elements S*# for each leg (phase) according to the corresponding drive signals g*#. In other words, the controller 20 is designed to alternately close and open a conductive path between first and second ends, i.e. the drain and source, of the high-side switching element S*p of one leg (phase) and that between the first and second terminals of the low-side switching element S*n of the same leg (phase).

Next, an example of the circuit structure of the controller 20 will be described with reference to FIG. 2.

The controller 20 is designed as, for example, a computer circuit consisting essentially of, for example, a CPU and a nonvolatile memory.

Figures 2, 3:
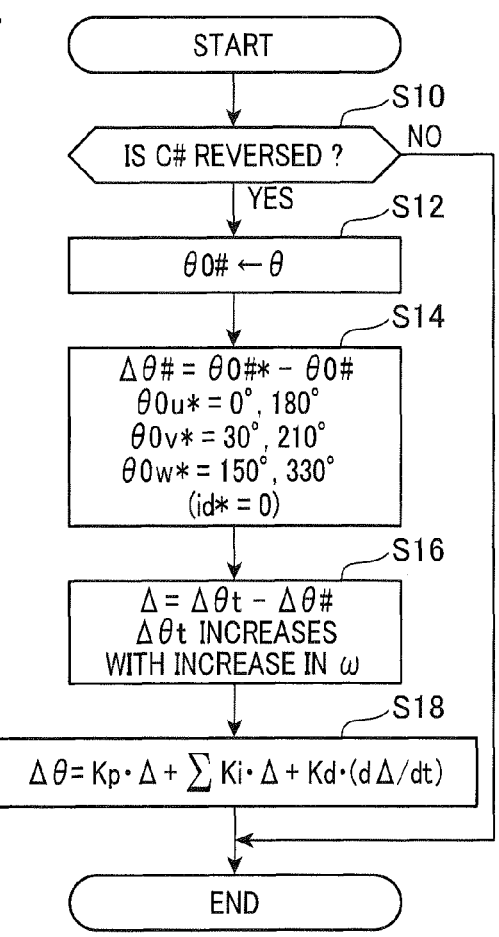
FIG. 2 is a flowchart schematically illustrating a phase compensation task carried out by a controller illustrated in FIG. 1.
FIG. 3 is a view schematically illustrating a map including information representing that which of three-phase currents flows through a negative DC bus line as a bus current for each of switching modes according to the first embodiment.

FIG. 2 schematically illustrates functional modules of the controller 20 equivalent to tasks to be executed by the controller 20.

As illustrated in FIG. 2, the controller 20 includes a command current setter 22, an angular velocity calculator 23, a command voltage setter 24, a three-phase converter 26, a drive signal generator 28, a phase manipulator 40, a phase corrector 42, a three-phase converter 50, absolute-value calculators 52, 54, 56, and 58, and a selector 60. The controller 20 also includes deviation calculators 62, 64, and 66, manipulated-variable calculators 70, 72, and 74, adders 76, 78, and 80, and multipliers 82, 84, and 86. The absolute-value calculators 52, 54, 56, and 58 are simply expressed as "abs" in FIG. 1, and the manipulated-variable calculators 70, 72, and 74 are also simply expressed as "PID" in FIG. 1.

The command current setter 22 is operative to receive the request torque Trq* input from the request torque input unit 36, and set a command d-axis current id* and a command q-axis current iq* in the d-q coordinate system of the rotor based on the request torque Trq*. The command d-axis current id* and a command q-axis current iq* are required to adjust the output torque of the motor 10 to the request torque Trq*.

In the first embodiment, the command current setter 22 sets the command d-axis current id* to zero. This causes the output torque of the motor 10 to be proportional to the command q-axis current iq*.

The angular velocity calculator 23 is operative to receive the rotational angle θ of the motor 10, and calculate an electric angular velocity ω corresponding to the rotational angle θ.

The command voltage setter 24 is operative to receive the command d-axis and q-axis currents id* and iq* output from the command current setter 22, and the angular velocity ω output from the angular velocity calculator 23. The command voltage setter 24 is also operative to set, based on the command d-axis and q-axis currents id* and iq* and the angular velocity ω, command d-axis and q-axis voltages vd* and vq* in the d-q coordinate system of the rotor as open-loop controlled variables. The command d-axis and q-axis voltages vd* and vq*, i.e. AC command voltages, are required to adjust d-axis and q-axis currents id and iq flowing in the motor 10 to the command d-axis and q-axis currents id* and iq*, respectively.

For example, the command voltage setter 24 according to the first embodiment is operative to set the command d-axis and q-axis voltages vd* and vq* using the following voltage equation [1]:

$$\begin{bmatrix} vd^* \\ vq^* \end{bmatrix} = \begin{bmatrix} Ls+R & -\omega L \\ \omega L & Ls+R \end{bmatrix} \begin{bmatrix} id^* \\ iq^* \end{bmatrix} + \begin{bmatrix} 0 \\ \omega \phi \end{bmatrix} \quad [1]$$

where R represents an armature resistance, φ represents a magnet flux linkage to armature winding, s, which can also be expressed as $$\frac{d}{dt},$$

represents differential operator. Specifically, the equation [1] can be expressed by the following voltage equations [1a] and [1b]:

$$vd^* = R \cdot id + L \cdot \frac{d}{dt} id^* - \omega \cdot L \cdot iq^* \quad [1a]$$

$$vq^* = R \cdot iq + L \cdot \frac{d}{dt} iq^* + \omega \cdot L \cdot id^* + \omega \cdot \phi \quad [1b]$$

The three-phase converter 26 stores therein, for example, a map in data-table format, in mathematical expression format, and/or program format. The map includes information indicative of, for example, variables of three-phase command voltages vu*, vv*, and vw* in the three-phase coordinate system as a function of a variable of a corrected rotational angle θa of the motor 10 and variables of the command voltages vd* and vq* in the d-q coordinate system. Specifically, the three-phase converter 26 is operative to convert, based on the map and the corrected rotational angle θa, the command voltages vd* and vq* in the d-q axes into three-phase command voltages vu*, vv*, and vw* for the respective AC power input terminals of the motor 10. That is, the three-phase converter 26 serves to obtain, based on the request torque Trq*, the three-phase command voltages vu*, vv*, and vw* as feedforward manipulated variables, i.e. open-loop manipulated variables, for the motor 10.

The corrected rotational angle θa has been obtained based on the rotational angle θ of the motor 10 measured by the rotational angle sensor 14. How the rotational angle θ of the motor 10 is corrected will be described later. The three-phase command voltages v#* (#=u, v, and w) correspond to, for example, substantially pseudo sinusoidal waves, respectively.

That is, the combination of the command current setter 22, the command voltage setter 24, and the three-phase converter 26 serve as a command-voltage setting module for setting the three-phase command voltages v#*.

The drive signal generator 28 is operative to divide, by the half (½) level of the inverter input voltage VDC, corrected command voltages v#*a to thereby generate normalized three-phase duty signals D#*, respectively. The corrected command voltages v#*a have been obtained based on the three-phase command voltages v#*. How the three-phase command voltages v#* are corrected will be described later.

The drive signal generator 28 is also operative to perform a PWM task based on comparison in magnitude between the duty signals D# and a cyclic triangular carrier Sc (see the block 28), thus generating PWM signals g#. Each of the PWM signals g# is a pulse signal with a controllable duty cycle (controllable pulse width). As the carrier Sc, a cyclic saw-tooth carrier signal can be used.

Specifically, the drive signal generator 28 is operative to delay the rising edge of each of the PWM signals g# by a dead time, thus generating high-side drive signals g#p (see the block 28). Similarly, the drive signal generator 28 is operative to delay the rising edge of each of logically reversed signals of the PWM signals g# by the dead time, thus generating low-side drive signals g#n (see the block 210).

In the first embodiment, for generation of the high-side and low-side drive signals g#p and g#n, the dead time (time delay) between each of the high-side drive signals g#p and a corresponding one of the low-side drive signals g#n is introduced to prevent a short circuit in the DC link.

The controller 20 according to the first embodiment is configured to basically perform the open-loop control to adjust d-axis and q-axis currents id and iq flowing in the motor 10 to the command d-axis and q-axis currents id* and iq*.

In addition to the configuration, the controller 20 according to the first embodiment is specially configured to perform a phase compensation task and an amplitude correction task for reduction of torque ripples in the motor 10.

The phase compensation task is designed to compensate for the phase of each of the three-phase currents i# actually flowing through the AC power input terminals of the motor 10 to thereby match the phase of each of the three-phase currents i# with that of a corresponding one of three-phase command currents iu*, iv*, and iw* based on the command d-axis and q-axis currents id* and iq*.

The amplitude correction task is designed to reduce the variations in the amplitudes of the respective three-phase currents i# actually flowing through the AC power input terminals of the motor 10.

Hereinafter, the phase compensation task and the amplitude correction task will be described.

First, the phase compensation task will be descried hereinafter.

The phase manipulator 40 is operative to receive the output signals C# from the comparators 30, 32, and 34, and calculate, based on the received output signals C#, a correction value Δθ for correcting the rotational angle θ of the motor 10.

Specific steps of the routine of calculating the correction value Δθ, which is carried out by the phase manipulator 40 every preset cycle, is illustrated in FIG. 2.

When starting the correction-value calculating routine, the phase manipulator 40 determines whether there is timing at which an output signal C# (#=u, v, or w) is logically reversed during the on duration of a corresponding switching element S#p in step S10. The operation in step S10 is to detect a timing at which the polarity of a corresponding phase current i# is reversed. In other words, the operation in step S10 is to detect a timing, i.e. a zero-cross timing, at which a corresponding phase current i# crosses through zero. That is, the combination of the comparators 30, 32, and 34, and the operations in steps S10 and S12 by the phase manipulator 40 serves as, for example, a zero-cross timing detector configured to detect a zero-cross timing when each of the plural-phase AC currents crosses through zero. The operations in steps S14 to S16 by the phase manipulator 40 serve as, for example, a phase manipulating module configured to manipulate the phase of one or more of the three-phase AC command voltages v#*.

Specifically, when the polarity of a phase current i# flowing in the motor 10 is reversed, the polarity of the potential difference between the drain and source of a corresponding switching element S#p is reversed. In step S10, how the phase manipulator 40 obtains the on duration of each of the switching elements S#p is based on switching-mode information, which is output from the drive signal generator 28 to the phase manipulator 40.

The switching-mode information specifies a present switching mode in a plurality of switching modes, i.e. on-off modes, of the respective switching elements S#* of the inverter INV. Specifically, as illustrated in FIG. 3, switching mode 0 represents that all the switching elements Sun, Svn, and Swn are in an on state, in other words, the remaining switching elements Sup, Svp, and Swp are in an off state. Switching mode 1 represents that the switching elements Sup, Svn, and Swn are in the on state, in other words, the remaining switching elements Sun, Svp, and Swp are in the off state. Switching mode 7 represents that all the switching elements Sup, Svp, and Swp are in the on state, in other words, the remaining switching elements Sun, Svn, and Swn are in the off state. For the other switching modes 2 to 6, please refer to FIG. 3. Based on the switching-mode information specifying the present switching mode of the switching elements S#* of the inverter INV, the phase manipulator 40 can obtain the on duration of each of the switching elements S#p.

Upon determination that there is timing at which an output signal C# (#=u, v, or w) is logically reversed during the on duration of a corresponding switching element S#p (YES in step S10), the correction-value calculating routine proceeds to step S12. In step S12, the phase manipulator 40 stores therein a value of the rotational angle θ of the motor 10 at the reverse timing, i.e. zero-cross timing, as a reverse phase θ0# (#=u, v, or w).

Note that the phase manipulator 40 according to the first embodiment stores therein reverse-phase command values θ0#* (#=u, v, and w) beforehand. Each of the reverse-phase command values θ0#* represents a command value of the rotational angle θ of the motor 10 at the reverse timing, i.e. zero-cross timing, of a corresponding one of the three-phase currents i#.

In the first embodiment, because the command current setter 22 sets the command d-axis current id* to zero, the reverse-phase command value θ0u* for the U-phase is set to one of 0° and 180°. That is, when the d-axis of the rotor passes through the rotational angle θ of 0° or 180°, the q-axis current vector passes through the direction orthogonal to the U-phase axis of the stator, i.e. the direction of the q-axis of the rotor, so that the polarity of the U-phase current iu is reversed. Similarly, the reverse-phase command value θ0v* for the V-phase is set to one of 30° and 210°. That is, when the d-axis of the rotor passes through the rotational angle θ of 30° or 210°, the q-axis current vector passes through the direction orthogonal to the V-phase axis of the stator, so that the polarity of the V-phase current iv is reversed. The reverse-phase command value θ0w* for the W-phase is set to one of 150° and 330°. That is, when the d-axis of the rotor passes through the rotational angle θ of 150° or 330°, the q-axis current vector passes through the direction orthogonal to the W-phase axis of the stator, so that the polarity of the W-phase current iw is reversed.

Specifically, in step S14, the phase manipulator 40 reads a reverse-phase command value θ0#* corresponding to the reverse phase θ0# stored in step S12, and subtracts the reverse phase θ0# from the reverse-phase command value θ0#*, thus calculating a deviation Δθ# between the reverse phase θ0# and the reverse-phase command value θ0#*. How to set the reverse-phase command value θ0u* for the U-phase to 0° or 180° is determined according to the actual rotational angle θ of the motor 10. Specifically, if the actual rotational angle θ of the motor 10 is higher than 270° and lower than 360°, or is higher than 0° and equal to or lower than 90°, the phase manipulator 40 sets the reverse-phase command value θ0u* for the U-phase to 0°. Otherwise, if the actual rotational angle θ of the motor 10 is higher than 90° and equal to or lower than 270°, the phase manipulator 40 sets the reverse-phase command value θ0u* for the U-phase to 180°.

How to set the reverse-phase command value θ0v* for the V-phase to 30° or 210° is determined according to the actual rotational angle θ of the motor 10. Specifically, if the actual rotational angle θ of the motor 10 is higher than 300° and lower than 360°, or is higher than 0° and equal to or lower than 120°, the phase manipulator 40 sets the reverse-phase command value θ0v* for the V-phase to 30°. Otherwise, if the actual rotational angle θ of the motor 10 is higher than 120° and equal to or lower than 300°, the phase manipulator 40 sets the reverse-phase command value θ0v* for the V-phase to 210°.

How to set the reverse-phase command value θ0w* for the W-phase to 150° or 330° is determined according to the actual rotational angle θ of the motor 10. Specifically, if the actual rotational angle θ of the motor 10 is higher than 60° and lower than 240°, the phase manipulator 40 sets the reverse-phase command value θ0w* for the W-phase to 30°. Otherwise, if the actual rotational angle θ of the motor 10 is higher than 240° and lower than 360°, or is higher than 0° and equal to or lower than 60°, the phase manipulator 40 sets the reverse-phase command value θ0w* for the W-phase to 330°.

Note that a deviation Δθ# should take one of a positive sign and a negative sign if a corresponding reverse phase θ0# is advanced with respect to a corresponding reverse-phase command value θ0#*, and should take the other thereof if a corresponding reverse phase θ0# is retarded with respect to a corresponding reverse-phase command value θ0#*.

Thus, if a reverse phase θ0u is equal to or higher than 270° and lower than 360°, i.e. located within the fourth quadrant, while a corresponding reverse-phase command value θ0u* is set to 0°, it is preferable that a value, which is obtained by subtracting 360° from the reverse phase θ0u, is redefined as the reverse phase θ0u.

Similarly, if a reverse phase θ0v is equal to or higher than 300° and lower than 360°, i.e. located within the fourth quadrant, while a corresponding reverse-phase command value θ0v* is set to 30°, it is preferable that a value, which is obtained by subtracting 360° from the reverse phase θ0v, is redefined as the reverse phase θ0v.

In addition, if a reverse phase θ0w is higher than 0° and equal to or lower than 60°, i.e. located within the first quadrant, while a corresponding reverse-phase command value θ0w* is set to 330°, it is preferable that a value, which is obtained by adding 360° to the reverse phase θ0w, is redefined as the reverse phase θ0w.

This redefinition makes it possible to calculate a deviation Δθ# that takes one of the positive sign and the negative sign if a corresponding reverse phase θ0# is advanced with respect to a corresponding reverse-phase command value θ0#*, and takes the other thereof if a corresponding reverse phase θ0# is retarded with respect to a corresponding reverse-phase command value θ0#*.

Following the operation in step S14, the phase manipulator 40 calculates the difference, i.e. the reverse-timing difference, Δ between the deviation Δθ# and a target value Δθt, which is expressed as Δ=Δθ#−Δθt in step S16.

Note that the target value Δθt is compensation for the delay of the reverse timing, i.e. the reverse phase, θ0# based on the logical reverse of a corresponding output signal C# and stored in step S12 relative to the actual reverse timing of the polarity of a corresponding phase current i#. The reverse-timing difference Δ is used for PID (Proportional-Integral-Derivative) feedback control, described later, which aims to adjust the deviation Δθ# to zero. That is, because the reverse timing θ0# is delayed with respect to the actual reverse timing of the polarity of a corresponding phase current i#, the deviation Δθ# is greater than an actual deviation between the actual reverse timing from the commanded reverse timing based on the reverse-phase command value θ0#*. Thus, as the actual deviation, the reverse-timing difference Δ, which is expressed as Δ=Δθ#−Δθt, is calculated in step S16.

The target value Δθt is preferably set such that the target value Δθt increases with an increase in the angular velocity ω of the motor 10. This setting is based on the fact that, the higher the angular velocity ω of the motor 10 is, the more the delay of the reverse timing θ0# stored in step S12 relative to the actual reverse timing of the polarity of a corresponding phase current i# is increased.

Next, the phase manipulator 40 calculates, as a manipulated variable, the correction value Δθ using the sum of a proportional gain term, an integral gain term, and a derivative gain term of a PID feedback control algorithm (PID algorithm), and the difference Δ as its input in step S18.

In the PID algorithm, the correction value Δθ is expressed based on the proportional gain term, the integral gain term, and the derivative gain term.

The proportional gain term for the correction value Δθ contributes to change in the correction value Δθ in proportion to the temporal deviations of the difference Δ from a target value of zero. The integral gain term is proportional to an accumulated offset of instantaneous values of the difference Δ over time to reset the accumulated offset (steady-state deviation) over time to zero. The derivative gain term is proportional to a difference between a previous value of the difference Δ and a present value thereof to improve the response of the correction value Δθ as the manipulated variable.

Specifically, the correction value Δθ as a manipulated variable is expressed by the following equation [2]:

$$\Delta\theta = Kp \cdot \Delta + \sum Ki \cdot \Delta + Kd \cdot \frac{d}{dt}\Delta \quad [2]$$

where Kp represents a proportional constant, i.e. a proportional gain, Ki represents an integral constant, i.e. an integral gain, and Kd represents a differential constant, i.e. a differential gain.

After completion of the calculation of the correction value Δθ, the phase manipulator 40 outputs the correction value Δθ to the phase corrector 42. The phase corrector 42 is operative to receive the correction value Δθ, and correct the rotational angle θ of the motor 10 by, for example, adding the correction value Δθ to the rotational angle θ of the motor 10, thus obtaining a corrected rotational angle θa. Then, the phase corrector 42 is operative to output the corrected rotational angle θa to the three-phase converter 26. As described above, the phase corrector 42 is operative to convert, based on the corrected rotational angle θa, the command voltages vd* and vq* in the d-q axes into three-phase command voltages vu*, vv*, and vw* for the respective AC power input terminals of the motor 10. Specifically, the phase corrector 42 is operative to shift the phase of each of the command voltages vd* and vq* by the correction value Δθ, and thereafter convert the phase-shifted command voltages vd* and vq* into three-phase command voltages vu*, vv*, and vw* for the respective AC power input terminals of the motor 10.

Next, the amplitude correction task will be described hereinafter.

The three-phase converter 50 stores therein, for example, a map in data-table format, in mathematical expression format, and/or program format. The map includes information indicative of, for example, variables of three-phase command voltages vu*, vv*, and vw* in the three-phase coordinate system as a function of a variable of the rotational angle θ of the motor 10 and variables of the command voltages vd* and vq* in the d-q coordinate system. Specifically, the three-phase converter 50 is operative to convert, based on the map and the rotational angle θ of the motor 10, the command d- and q-axis currents id* and iq* in the d-q axes output from the command current setter 22 into three-phase command currents i#* for the respective AC power input terminals of the motor 10.

That is, the combination of the command current setter 22 and the three-phase converter 50 serves as, for example, a command-current calculating module for calculating the three-phase command currents i#*.

The absolute-value calculator 52 is operative to calculate the absolute value of the U-phase command current iu*, and input the absolute value of the U-phase command current iu* to the deviation calculator 62. Similarly, the absolute-value calculator 54 is operative to calculate the absolute value of the V-phase command current iv*, and input the absolute value of the V-phase command current iv* to the deviation calculator 64. In addition, the absolute-value calculator 56 is operative to calculate the absolute value of the W-phase command current iw*, and input the absolute value of the W-phase command current iw* to the deviation calculator 66.

On the other hand, the instantaneous value of the bus current IDC measured by the current sensor 18 is input to the absolute-value calculator 58. The absolute-value calculator 58 serves as, for example, an absolute value calculating module that converts the instantaneous value of the bus current IDC into the absolute value of the bus current IDC. The absolute-value calculator 58 outputs the absolute value of the bus current IDC to the selector 60, so that the absolute value of the bus current IDC is input to the selector 60.

The selector 60 is operative to receive the switching-mode information output from the drive signal generator 28, and selectively output the absolute value of the bus current IDC to one of the deviation calculators 62, 64, and 66.

For example, the selector 60 stores therein a map M in data-table format, in mathematical expression format, and/or program format. As illustrated in FIG. 3, the map M includes information representing that which of three-phase currents i# flows through the negative DC bus line Ln as the bus current IDC for each of the switching modes 1 to 6. For example, for the switching mode 1 in which the switching elements Sup, Svn, and Swn are the on state, the U-phase current iu flows through the negative DC bus line Ln as the bus current IDC. For the switching mode 5 in which the switching elements Sun, Svn, and Swp are the on state, the W-phase current iw flows through the negative DC bus line Ln as the bus current IDC.

Specifically, the selector 60 references the map M using the switching mode of the switching-mode information as a key, and obtains the absolute value of the bus current IDC which matches with the absolute value of whichever of the three-phase currents iu iv, and iw is currently flowing based on the result of the reference. Then, the selector 60 selects one of the deviation calculators 62, 64, 66 corresponding to the absolute value of one-phase current matching with that of the bus current IDC, and outputs the absolute value of the bus current IDC to the selected one of the deviation calculators 62, 64, 66.

Note that, in the map illustrated in FIG. 3, the sign of each of the three-phase currents i# is defined such that, if a corresponding one-phase current i# flows toward the motor 10 from the inverter INV, the sign of the corresponding one-phase current i# is positive. Thus, if a corresponding one-phase current i# flows toward the inverter INV from the motor 10, the sign of the corresponding one-phase current i# is negative.

That is, the combination of the current sensor 18 and the absolute-calculator 58 serve as, for example, a current obtaining module configured to obtain the three-phase currents i# flowing through the AC power input terminals of the motor 10. The selector 60 serves as, for example, a specifying module configured to specify which phase AC current in the three-phase currents i# is obtained by the current obtaining module.

The deviation calculator 62 is operative to subtract the absolute value of the bus current IDC from the absolute value of the U-phase command current iu* if the deviation calculator 62 is selected by the selector 60. The subtraction obtains the deviation in amplitude between the U-phase command current iu* and the U-phase current iu. The deviation calculator 62 is also operative to output the deviation, i.e. the U-phase amplitude deviation, to the manipulated-variable calculator 70.

Similarly, the deviation calculator 64 is operative to subtract the absolute value of the bus current IDC from the absolute value of the V-phase command current iv* if the deviation calculator 64 is selected by the selector 60. The subtraction obtains the deviation in amplitude between the V-phase command current iv* and the V-phase current iv. The deviation calculator 64 is also operative to output the deviation, i.e. the V-phase amplitude deviation, to the feedback manipulated-variable calculator 72.

In addition, the deviation calculator 66 is operative to subtract the absolute value of the bus current IDC from the absolute value of the W-phase command current iw* if the deviation calculator 66 is selected by the selector 60. The subtraction obtains the deviation in amplitude between the W-phase command current iw* and the W-phase current iw. The deviation calculator 66 is also operative to output the deviation, i.e. the W-phase amplitude deviation, to the feedback manipulated-variable calculator 74.

That is, the combination of the deviation calculators 62, 64, and 66 serves as, for example, a deviation calculating module. The deviation calculating module is configured to calculate the deviation between the absolute value of each of the three-phase currents i#* and the absolute value of a corresponding one of the three-phase AC command currents i#*.

The manipulated-variable calculator 70 is operative to receive the U-phase amplitude deviation output from the deviation calculator 62, and calculate a manipulated variable for the U-phase command voltage vu*, which aims to reduce the U-phase amplitude deviation.

Similarly, the feedback manipulated-variable calculator 72 is operative to receive the V-phase amplitude deviation output from the deviation calculator 64, and calculate a manipulated variable for the V-phase command voltage vv*, which aims to reduce the V-phase amplitude deviation.

In addition, the feedback manipulated-variable calculator 74 is operative to receive the W-phase amplitude deviation output from the deviation calculator 66, and calculate a manipulated variable for the W-phase command voltage vw*, which aims to reduce the W-phase amplitude deviation.

Specifically, the manipulated-variable calculator 70 calculates the manipulated variable using the sum of a proportional gain term, an integral gain term, and a derivative gain term of a PID feedback control algorithm (PID algorithm) using the U-phase amplitude deviation as its input.

In the PID algorithm, the manipulated variable is expressed based on the proportional gain term, the integral gain term, and the derivative gain term.

The proportional gain term for the manipulated variable contributes to change in the manipulated variable in proportion to the temporal deviations of the U-phase amplitude deviation from a target value of zero. The integral gain term is proportional to an accumulated offset of instantaneous values of the U-phase amplitude deviation over time to reset the accumulated offset (steady-state deviation) over time to zero. The derivative gain term is proportional to a difference between a previous value of the U-phase amplitude deviation and a present value thereof to improve the response of the manipulated variable.

For example, the manipulated variable MV is expressed by the following equation [3]:

$$MV = Kp \cdot \Delta Du + \sum Ki \cdot \Delta Du + Kd \cdot \frac{d}{dt}\Delta Du \qquad [3]$$

where Kp represents a proportional constant, i.e. a proportional gain, ΔDu represents the U-phase amplitude deviation, Ki represents an integral constant, i.e. an integral gain, and Kd represents a differential constant, i.e. a differential gain.

Note that the time constant of the feedback control of each of the manipulated-variable calculators 70, 72, and 74 is set such that:

the feedback-control response by a corresponding one of the feedback manipulated-variable calculators 70, 72, and 74 is lower than the response of the correction-value calculating routine by the phase manipulator 40.

This setting of the time constant of the feedback control of each of the manipulated-variable calculators 70, 72, and 74 makes it possible to more improve the accuracy of the feedback control by the manipulated-variable calculators 70, 72, and 74. Specifically, this setting of the time constant matches the phase of each of the three-phase command currents i#* with that of a corresponding one of the actual three-phase currents i# when the feedback control is carried out by a corresponding one of the manipulated-variable calculators 70, 72, and 74.

The adder 76 is operative to add 1 to the value of the manipulated variable output from the manipulated-variable calculator 70, and output the result of the addition to the multiplier 82 as a U-phase amplitude correction coefficient for correcting the U-phase command voltage vu*. That is, if the polarity of the value of the manipulated variable is positive, the U-phase amplitude correction coefficient is 1.x; x corresponds to the value of the manipulated variable. Otherwise, if the polarity of the value of the manipulated variable is negative, the U-phase amplitude correction coefficient is 0.x; x corresponds to the value of the manipulated variable.

The multiplier 82 is operative to multiply the U-phase command voltage vu* obtained by the three-phase converter 26 by the U-phase amplitude correction coefficient output from the adder 76, thus obtaining a corrected U-phase command voltage vu*. Then, the multiplier 82 outputs the corrected U-phase command voltage vu* to the drive signal generator 28 as a U-phase command voltage vu*.

Similarly, the adder 78 is operative to add 1 to the value of the manipulated variable output from the manipulated-variable calculator 72, and output the result of the addition to the multiplier 84 as a V-phase amplitude correction coefficient for correcting the V-phase command voltage vv*. The multiplier 84 is operative to multiply the V-phase command voltage vv* obtained by the three-phase converter 26 by the V-phase amplitude correction coefficient output from the adder 78, thus obtaining a corrected V-phase command voltage vv*. Then, the multiplier 84 outputs the corrected V-phase command voltage vv* to the drive signal generator 28 as a V-phase command voltage vv*.

In addition, the adder 80 is operative to add 1 to the value of the manipulated variable output from the manipulated-variable calculator 74, and output the result of the addition to the multiplier 86 as a W-phase amplitude correction coefficient for correcting the W-phase command voltage vw*. The multiplier 86 is operative to multiply the W-phase command voltage vw* obtained by the three-phase converter 26 by the W-phase amplitude correction coefficient output from the adder 80, thus obtaining a corrected W-phase command voltage vw*. Then, the multiplier 86 outputs the corrected W-phase command voltage vw* to the drive signal generator 28 as a W-phase command voltage vw*.

That is, the combination of the command current setter 22, the three-phase converter 50, the absolute-value calculators 52, 54, and 56, the deviation calculators 62, 64, and 66, the manipulated-variable calculators 70, 72, and 74, the adders 76, 78, and 80, and the multipliers 82, 84, and 86 serves as, for example, an amplitude correcting module for correcting the amplitude of at least one of the three-phase command voltages v#*.

Particularly, the absolute-value calculators 52, 54, and 56, the deviation calculators 62, 64, and 66, the manipulated-variable calculators 70, 72, and 74, the adders 76, 78, and 80, and the multipliers 82, 84, and 86 serves as, for example, a correction value calculating module configured to calculate a correction value that corrects the amplitude of at least one-phase command voltage v#*. In addition, the combination of the absolute-value calculators 52, 54, and 56, the deviation calculators 62, 64, and 66, and the manipulated-variable calculators 70, 72, and 74 serves as, for example, a manipulated-variable calculating module configured to calculate a manipulated variable for the at least one-phase command voltage v#*. The combination of the adders 76, 78, and 80 serves as an adding module configured to add 1 to the manipulated variable calculated by the manipulated-variable calculating module. The combination of the multipliers 82, 84, and 86 serves as a multiplying module configured to multiply the at least one-phase command voltage u#* by a result of the addition by the adding module to thereby correct the amplitude of the at least one-phase AC command voltage i#*.

As described above, the system 100 according to the first embodiment is configured such that the deviation calculators 62, 64, and 66, the manipulated-variable calculators 70, 72, and 74, the adders 76, 78, and 80, and the multipliers 82, 84, and 86 cooperatively serve to correct the amplitudes of the respective three-phase command voltages v#* to reduce the variations in the amplitudes of the three-phase currents i#, thus reducing torque ripples in the motor 10.

Note that the deviation calculators 62, 64, and 66 can serve as calculators, each of which can be configured to calculate the ratio between the absolute value of a corresponding phase command current i#* output from a corresponding absolute-value calculator 52, 54, or 56 and that of the bus current IDC.

Specifically, each of the calculators 62, 64, and 66 can be configured to:

specify, based on the rotational angle θ of the motor 10 and the phases of corresponding d- and q-axis command currents id* and iq*, periods during which a corresponding actual phase current i# is zero or close to zero; and calculate the deviation of a corresponding actual phase current i# by a corresponding phase command current i#* within periods other than the specified periods.

Then, each of the calculators 62, 64, and 66 can be configured to quantify a correction value for a corresponding phase command voltage v#* based on the calculated deviation. In this modification, the manipulated-variable calculators 70, 72, and 74 and adders 76, 78, and 80 are eliminated, and the multipliers 82, 84, and 86 serve as calculators. Each of the calculators 82, 84, and 86 is configured to correct a corresponding phase command voltage v#* based on the correction value quantified therefor.

This modification can also correct the amplitudes of the respective three-phase command voltages v#* to reduce the variations in the amplitudes of the three-phase currents i#.

Note that, in this modification, if the denominator of the ratio calculated by a calculator is close to zero, the calculator can avoid calculation of the ratio between the absolute value of a corresponding phase command current i#* output from a corresponding absolute-value calculator 52, 54, or 56 and that of the bus current IDC.

FIG. 4A schematically illustrates how the three-phase currents i# change with time, and how torque ripples appear according to the first embodiment. In contrast, FIG. 4B schematically illustrates how three-phase currents i# change with time, and how torque ripples appear according to a comparative example in which the three-phase command voltages v#* output from the command voltage setter 24 are used while their amplitudes and phases are uncorrected.

FIG. 4A demonstrates that the amplitudes of the three-phase currents i# are matched with each other, and therefore, the torque ripples appearing in the motor 10 according to the first embodiment are sufficiently low.

In contrast, FIG. 4B demonstrates that the variations in the amplitudes of the three-phase currents i# remain, and therefore, the torque ripples, which are greater than those appearing in the motor 10 according to the first embodiment, also remain.

In addition, FIG. 5A schematically illustrates how the command d- and q-axis currents id* and iq* and the corresponding actual d- and q-axis currents id and iq change with time according to the first embodiment. FIG. 5A also schematically illustrates how the command U-phase current iu* and the corresponding actual U-phase current iu change with time according to the first embodiment.

In contrast, FIG. 5B schematically illustrates how the command B- and q-axis currents id* and iq* and the corresponding actual d- and q-axis currents id and iq change with time according to the comparative example. FIG. 5B also schematically illustrates how the command U-phase current iu* and the corresponding actual U-phase current iu change with time according to the comparative example.

As illustrated in FIG. 5A, the phase manipulator 40 according to the first embodiment permits:

the actual d-axis current id to be substantially in agreement with the command d-axis current id*;

the actual q-axis current iq to be substantially in agreement with the command q-axis current iq*; and the actual U-phase current iu to follow the change in the command U-phase current iu* with high accuracy.

The relationship between the actual U-phase current iu and the command U-phase current iu* according to the first embodiment can be established for the relationship between the actual V-phase current iv and the command V-phase current iv* and that between the actual W-phase current iw and the command W-phase current iw* according to the first embodiment.

In contrast, as illustrated in FIG. 5B, the actual d-axis current id has a gap with respect to the command d-axis current id*; and the actual q-axis current component iq has a gap with respect to the command q-axis current component iq*. In addition, the actual U-phase current iu is shifted in phase from the command U-phase current iu*.

The relationship between the actual U-phase current iu and the command U-phase current iu* according to the comparative example can be established for the relationship between the actual V-phase current iv and the command V-phase current iv* and that between the actual W-phase current iw and the command W-phase current iw* according to the comparative example.

As described above, the system 100 according to the first embodiment is configured to obtain the deviations between the amplitudes of the actual three-phase currents i# and those of the respective three-phase command currents i#* based on the deviations between the absolute values of the three-phase command currents i# and those of the actual three-phase currents i#.

The system 100 is also configured to individually correct the three-phase command voltages v#* such that the deviations are reduced, thus reducing the variations in the amplitudes of the actual three-phase currents i#, in other words, matching the amplitudes of the actual three-phase currents i# with each other.

This configuration results in the reduction of the variations in the amplitudes of the actual three-phase currents i#, thus reducing toque ripples in the motor 10.

Specifically, the system 100 is configured such that each of the adders 76, 78, and 80 adds 1 to the value of the manipulated variable output from a corresponding one of the manipulated-variable calculators 70, 72, and 74. This obtains three-phase amplitude correction coefficients for correcting the respective three-phase command voltage v#*. That is, it is possible to easily manipulate the amplitudes of the three-phase command voltage v#* by multiplying the three-phase command voltage v#* by the three-phase amplitude correction coefficients independently of the polarities of the values of the manipulated variables output from the respective manipulated-variable calculators 70, 72, and 74.

The system 100 is configured such that each of the manipulated-variable calculators 70, 72, and 74 calculates a manipulated variable that aims to match the absolute value of a corresponding actual phase current i# with that of a corresponding phase command current i#* This configuration establishes that every magnitude correlation between the amplitude of each of the actual three-phase currents i# and that of a corresponding one of the phase command current i#* corresponds to one of the polarities of the U-, V-, and W-phase amplitude deviations output from the respective deviation calculators 62, 64, and 66.

Specifically, if the amplitude of a command current i#* is greater than that of a corresponding actual phase current i#, the corresponding phase absolute deviation output from a corresponding one of the deviation calculators 62, 64, and 66 is positive. Otherwise, if the amplitude of a command current i#* is shorter than that of a corresponding actual phase current i#, the corresponding phase absolute deviation output from a corresponding one of the deviation calculators 62, 64, and 66 is negative. Thus, it is possible to maintain the polarities of the gains of a corresponding one of the manipulated-variable calculators 70, 72, and 74 at positive independently of the polarity of an input actual phase current i#.

This enables calculation of the manipulated variables without limiting the polarities of the actual three-phase currents i#, in other words, without performing a process to reverse the polarities of the gains of at least one of the manipulated-variable calculators 70, 72, and 74 according to the polarity of a corresponding at least one of the actual three-phase currents i#.

The system 100 is provided with the phase manipulator 40 that matches the phase of each of the actual three-phase currents i# with that of a corresponding one of three-phase command currents i#*. This improves the accuracy of feedback control that matches the absolute value of each of the actual three-phase currents i# with that of a corresponding one of three-phase command currents i#*.

The system 100 according to the first embodiment is configured such that each target value Δθt, which is compensation for the delay of a corresponding reverse timing θ0#, increases with an increase in the angular velocity ω of the motor 10 (see step S16). This configuration makes it possible to compensate for the delay of each reverse timing θ0# detected by the phase manipulator 40 with high accuracy even if the angular velocity ω of the motor 10 is high.

The system 100 is configured to detect the zero-cross timing at which each phase current i# crosses through zero based on a corresponding output signal C# indicative of the measured polarity of the potential difference between the drain and source of a corresponding switching element Sr. This configuration enables simple detection of the zero-cross timing at which each phase current i# crosses through zero.

The system 100 is configured such that the switching-mode information, which specifies a present switching mode in the plurality of switching modes of the respective switching elements S∩* of the inverter INV, is input to the selector 60. The selector 60 selectively outputs the absolute value of the bus current IDC to one of the deviation calculators 62, 64, and 66 as a function of the switching-mode information. This configuration allows determination of whether the absolute value of the bus current IDC is in agreement with the absolute value of any one of the actual three-phase currents i#. This makes it possible to generate the three-phase amplitude deviations to be input to the respective manipulated-variable calculators 70, 72, and 74 without using several current sensors for measuring at least two-phase currents flowing in the motor 10.

Second Embodiment

A control system 100A for the motor 10 according to a second embodiment of the present disclosure will be described with reference to FIG. 6.

The structure and/or functions of the control system 100A according to the second embodiment are different from those of the control system 100 by the following points. So, the different points will be mainly described hereinafter.

Referring to FIG. 6, a controller 20A includes a dead-time compensator 90 and adders 92, 94, and 96 in addition to the functional modules of the controller 20.

The dead-time compensator 90 is operative to receive the output signals C# from the comparators 30, 32, and 34 and the switching-mode information sent from the drive signal generator 28. The dead-time compensator 90 is also operative to calculate, based on the received output signals C# and the switching-mode information, correction values dt# for correcting corresponding command voltages v#*.

The output signals C# and the switching-mode information are input information used for the dead-time compensator 90 to determine the polarities of the three-phase currents i#. For example, if an output signal C# has the logical high level while it is determined that a corresponding switching element S#p is the on state based on the switching-mode information, the dead-time compensator 90 can determine that the polarity of a corresponding phase current i# is negative during a dead time.

Specifically, when a phase current i# (#=u, v, or w) is negative during a dead time, a current flows through a corresponding upper-arm diode D*p to continuously cause the negative phase current i# to flow during the dead time. For this reason, the on duration of a drive signal g#p for a corresponding upper-arm switching element is longer than the on duration of the corresponding PWM signal g# by the dead time.

In this case, the dead time compensator 90 corrects a corresponding phase command voltage v#* output from a corresponding one of the multipliers 82, 84, and 86 by adding a negative dead-time correction value dt# thereto via a corresponding one of the adders 92, 94, and 96. The corrected command voltage v#* is input to the drive signal generator 28, thus correcting the longer on duration of the drive signal g#p.

On the other hand, when a phase current i# (#=u, v, or w) is positive during a dead time, a current flows through a corresponding lower-arm diode D*n to continuously cause the positive phase current i# to flow during the dead time. For this reason, the on duration of a drive signal g#p for a corresponding upper-arm switching element is shorter than the on duration of the corresponding PWM signal g# by the dead time.

In this case, the dead time compensator 90 corrects a corresponding phase command voltage v#* output from a corresponding one of the multipliers 82, 84, and 86 by adding a positive dead-time correction value dt# thereto via a corresponding one of the adders 92, 94, and 96. The corrected command voltage v#* is input to the drive signal generator 28, thus correcting the shorter on duration of the drive signal g#p.

Other structures and functions of the control system 100A are identical to those of the control system 100.

As described above, the system 100A according to the second embodiment is configured to correct the longer or shorter on duration of a corresponding PWM signal g# by a dead time. This results in maintenance of the accuracy of controlling a controlled variable of the motor 10 at a high level.

The first and second embodiments and their modifications can be changed and/or modified within the scope of the present disclosure.

In each of the first and second embodiments, a command-current setting module comprised of the command current setter 22 and the command voltage setter 24 is configured to set command d-axis and q-axis voltages vd* and vq* using the voltage equation [1] set forth above. However, the present disclosure is not limited to the configuration. Specifically, the command-current setting module according to the present disclosure can be configured to set command d-axis and q-axis voltages vd* and vq* using a map in data-table format, in mathematical expression format, and/or program format.

The map includes information indicative of for example, variables of command d-axis and q-axis voltages vd* and vq* as a function of variables of the command d-axis and q-axis currents id* and iq* and a variable of the angular velocity ω of the motor 10. If the motor 10 is designed as an induction motor, the command-current setting module according to the present disclosure can be configured to set command d-axis and q-axis voltages vd* and vq* based on V/f control. For example, the V/f control is the control method in which the output voltage (V) of the inverter INV is adjusted proportionally to the output frequency (f) of the inverter INV.

In each of the first and second embodiments, none of the manipulated-variable calculators 70, 72, and 74 are limited to the structure that calculates a manipulated variable using the sum of a proportional gain term, an integral gain term, and a derivative gain term of a PID algorithm. Specifically, all of the manipulated-variable calculators 70, 72, and 74 can be configured to calculate a manipulated variable using the sum of a proportional gain term and an integral gain term of a PID algorithm.

None of the manipulated-variable calculators 70, 72, and 74 are limited to the structure in which an amplitude deviation between an actual phase current i# and a corresponding command current i#* is input thereto. Specifically, all of the manipulated-variable calculators 70, 72, and 74 can be configured to:

receive the subtraction of an actual phase current i# from a corresponding command current i#*;

specify the polarity of the actual phase current i# based on the rotational angle θ of the motor 10 and the phases of corresponding d- and q-axis command currents id* and iq*; and reverse the polarities of the gains of a corresponding one of the manipulated-variable calculators 70, 72, and 74 according to the specified polarity of a corresponding actual phase current i#.

For example, if the polarity of an actual phase current i# input to each of the manipulated-variable calculators 70, 72, and 74 is negative, and the subtraction of the actual phase current i# from a corresponding command current i#* is negative, i.e. the amplitude of the command current i#* is greater than that of the actual phase current i#, the polarities of the gains of a corresponding one of the manipulated-variable calculators 70, 72, and 74 are reversed from positive to negative. In addition, if the polarity of an actual phase current i# input to each of the manipulated-variable calculators 70, 72, and 74 is negative, and the subtraction of the actual phase current i# from a corresponding command current i#* is positive, i.e. the amplitude of the command current i#* is shorter than that of the actual phase current i#, the polarities of the gains of a corresponding one of the manipulated-variable calculators 70, 72, and 74 are reversed from positive to negative.

Each of the controllers 20 and 20A serves as an amplitude correcting module configured to correct the amplitudes of the three-phase command voltages v#*using the components 52, 54, 56, 62, 64, 66, 70, 72, 74, 76, 78, and 80, but the present disclosure is not limited thereto. Specifically, each of the controllers 20 and 20A serves as an amplitude correcting module configured to:

measure actual three-phase currents i# flowing in the motor 10 to specify peak values of the respective three-phase currents i# (see step S20 of FIG. 7);

calculate correction values for the specified peak values of the respective three-phase currents i# such that the specified peak values are normalized to a predetermined value (see step S21); and correct the amplitudes of the three-phase command voltages v#* based on the calculated correction values (see step S22).

This modification results in reduction of the variations of the amplitudes of the actual three-phase currents i#.

In each of the first and second embodiments, the phase manipulator 40 is configured to detect a zero-cross timing at which each phase current i# crosses through zero using a corresponding one of the output signals C# from the respective comparators 30, 32, and 34. However, the present disclosure is not limited to the configuration. Specifically, each of the comparators 30, 32, and 34 can serve as a differential amplifier configured to receive the potential difference between the first and second ends of the conductive path of a corresponding switching element S#p, and amplify the potential difference. In this modification, the phase manipulator 40 serves as a hard-wired logic unit or programmed logic unit configured to compare the potential difference output from each of the differential amplifiers 30, 32, and 34 with a predetermined reference voltage, and to detect a zero-cross timing at which a corresponding phase current i# crosses through zero based on the compared results.

In each of the first and second embodiments, each of the comparators 30, 32, and 34 is configured to detect the polarity of the potential difference between the first and second ends, i.e. the drain and source, of the conductive path of a corresponding upper-arm switching element S#p, but the present disclosure is not limited thereto. Specifically, each of the comparators 30, 32, and 34 can be configured to detect the polarity of the potential difference between the first and second ends, i.e. the drain and source, of the conductive path of a corresponding lower-arm switching element S#n.

In each of the first and second embodiments, the phase manipulator 40 can be configured to detect a zero-cross timing at which each phase current i# crosses through zero using the bus current IDC flowing through the negative DC bus line Ln. In this modification, eight space voltage vectors V0 to V7 are defined to express the respective switching modes 0 to 7 illustrated in FIG. 3. Specifically, in this modification, the drive signal generator 28 is designed to use, in place of the carrier-comparison PWM task set forth above, a space-vector modulation task. The space-vector modulation task is one of plural tasks for setting an average of the variations in the output voltage of the inverter INV over each period of the cyclic triangular carrier Sc to the command voltages v#*.

For example, in the space-vector modulation task, the drive signal generator 28 is designed to select three effective voltage vectors adjacent to each other in the six effective switching voltage vectors V1 to V6 other than the zero voltage vectors V0 and V7, and selects one zero voltage vector within each period of the cyclic triangular carrier Sc. Then, the drive signal generator 28 determines an average voltage vector based on the selected three effective voltage vectors and the one zero voltage vector as the vector of the command d- and q-axis command voltages vd* and vq*.

This design produces, within each period of the cyclic triangular carrier Sc, a time intervals in which the absolute value of the bus current IDC is in agreement with the absolute value of a corresponding one of the three-phase currents i#. Thus, the phase manipulator 40 is adapted to determine whether the polarity of each phase current is reversed every continuous two periods of the cyclic triangular carrier Sc based on variations in the bus current IDC. Note that, in the space-vector modulation task, the drive signal generator 28 preferably selects three effective voltage vectors adjacent to each other and one zero voltage vector such that two of the selected three effective voltage vectors has the minimum angle with respect to the vector of the command d- and q-axis command voltages vd* and vq* in the six effective voltage vectors.

The phase manipulator 40 cam calculate, as a manipulated variable, the correction value Δθ using the sum of the proportional gain term and the integral gain term of a PID feedback control algorithm in step S18.

In step S16, the target value Δθt is set such that the target value Δθt increases with an increase in the angular velocity ω of the motor 10, but the present disclosure is not limited thereto. Specifically, the phase manipulator 40 can be comprised of a counter. The counter is designed to count the amount of rotation of the motor 10 between a zero-cross timing of one of an actual phase current i# and a corresponding phase command current i# and that of the other thereof; the zero-cross timing of one of the actual phase current i# and the corresponding phase command current i# is earlier than the other thereof. The target value Δθt is compensation for the delay of the other of the actual phase current i# and the corresponding phase command current i# based on the counted amount of rotation of the motor 10.

In the second embodiment, the dead-time compensator 90 is operative to calculate, based on the potential difference between the first and second ends of the conductive path of each of the switching elements S#p and the switching-mode information, a correction value dt# for correcting a corresponding command voltage v#*. However, the present disclosure is not limited thereto. Specifically, the dead-time compensator 90 can be operative to calculate, based on the polarity of each of the command currents i#* and the switching-mode information, a correction value dt# for correcting a corresponding command voltage v#*.

In each of the first and second embodiments, the current sensor 18 is operative to measure, as the bus current IDC flowing through at least one of the negative input terminals of the inverter INV, an instantaneous value of one of three-phase currents i# actually flowing in the motor 10. However, the current sensor 18 can be operative to measure, as the bus current IDC flowing through at least one of the positive input terminals of the inverter INV, an instantaneous value of one of three-phase currents i# actually flowing in the motor 10.

The current sensor 18 can be operative to measure instantaneous values of at least two of three-phase currents i#, such as u- and v-phase currents iu and iv, actually flowing in the motor 10. If the current sensor 18 is operative to measure instantaneous values of two-phase currents iu and iv, an instantaneous value of the remaining phase current iw can be calculated based on the instantaneous values of the two-phase currents iu and iv. In this modification, the absolute values of the instantaneous values of the three-phase currents iu, iv, and iw are directly inputted to the respective deviation calculators 62, 64, and 66, so that the selector 60 can be eliminated.

In each of the first and second embodiments, the phase manipulator 40 is operative to match a zero-cross timing of each actual phase current i# with that of a corresponding phase command current i#*, but the present disclosure is not limited thereto.

Specifically, the phase manipulator 40 can be configured to receive instantaneous values of the actual three-phase currents iu, iv, and iw from the current sensor 18 within each period of the cyclic triangular carrier Sc, i.e. each PWM period.

In a first phase-correction modification, the phase manipulator 40 calculates the first absolute value of the difference between each of the three-phase command currents i#* and a corresponding one of the actual three-phase currents iu, iv, and iw. In addition, the phase manipulator 40 calculates the second absolute value of the difference between each of corrected three-phase command currents i#*, which is advanced in phase by an angle relative to a corresponding one of the original command currents i#*, and a corresponding one of the actual three-phase currents iu, iv, and iw. The angle will be referred to as an advance angle.

In the first phase-correction modification, the phase manipulator 40 compares the first absolute values with the second absolute values for the respective phases, and if the second absolute values are lower than the first absolute values for the respective phases, the phase manipulator 40 sets the correction value $\Delta\theta$ to the advance angle. Note that each of the corrected three-phase command currents i#*, which is advanced in phase by an advance angle relative to a corresponding one of the original command currents i# can be calculated by the three-phase converter 50 by advancing, by the advance angle, the rotational angle $\theta$ of the motor 10 and the command voltages vd* and vq*.

In a second phase-correction modification, the phase manipulator 40 calculates, in addition to the first absolute value, the third absolute value of the difference between each of corrected three-phase command currents i#*, which is retarded in phase by an angle relative to a corresponding one of the original command currents i#*, and a corresponding one of the actual three-phase currents iu, iv, and iw. The angle will be referred to as a retard angle.

In the second phase-correction modification, the phase manipulator 40 compares the first absolute values with the third absolute values for the respective phases, and if the third absolute values are lower than the first absolute values for the respective phases, the phase manipulator 40 sets the correction value $\Delta\theta$ to the retard angle. Note that each of the corrected three-phase command currents i# which is retarded in phase by a retard angle relative to a corresponding one of the original command currents i# can be calculated by the three-phase converter 50 by advancing, by the retard angle, the rotational angle $\theta$ of the motor 10 and the command voltages vd* and vq*.

In this modification, if the phase manipulator 40 uses a timing or thereabout at which at least one of paired switching modes corresponding to effective voltage vectors used in each PWM period changes, it is unnecessary for the phase manipulator 40 to obtain information of all the actual three-phase currents iu, iv, and iw every PWM period.

Specifically, in this case, the phase manipulator 40 can use information of a first-phase current i# obtained before the timing, and that of a second-phase current i# obtained after the timing. Then, the phase comparator 40 can calculate the first absolute value of the difference between each of the first and second-phase currents i# and a corresponding one of the command currents i#*. In addition, the phase manipulator 40 can calculate the second absolute value of the difference between each of the first and second-phase currents i# and a corresponding one of corrected phase command currents i#*, which is advanced in phase by an advance angle relative to a corresponding one of the original command currents i#*. The phase manipulator 40 can compare the first absolute values with the second absolute values for the respective first and second phases, and if the second absolute values are lower than the first absolute values for the respective phases, the phase manipulator 40 can set the correction value $\Delta\theta$ to the advance angle.

The phase manipulator 40 is operative to manipulate the phases of the three-phase command voltages v#* such that the actual three-phase currents i# matches in phase with the respective three-phase command currents iu*, iv*, and iw*. However, the present disclosure is not limited thereto.

Specifically, the phase manipulator 40 can be configured to manipulate the phase of the output voltage of the inverter INV such that a zero cross timing of a line-to-line current flowing in the motor 10 when the switching mode is set to the switching mode 0 or the switching mode 7 matches with that of the amount of change in the line-to-line current. The configuration of the phase manipulator 40 according to this modification has been known in, for example, U.S. Patent Publication No. 8,106,622 B2. Because the U.S. patent is assigned to the same assignee as that of this application, the disclosure of which is incorporated herein by reference.

In each of the first and second embodiments, the control system 100 or 100A is provided with the inverter INV for supplying AC power to the input terminals of the motor 10, but the present disclosure is not limited thereto. Specifically, the control system 100 or 100A can be provided with a power converter and a power accumulator for supplying AC power to the input terminals of the motor 10. The configuration of the power converter according to this modification has been known in, for example, U.S. Patent Publication No. 8,154,230 B2. Because the U.S. patent is assigned to the same assignee as that of this application, the disclosure of which is incorporated herein by reference.

In each of the aforementioned embodiments, an SPMSM is used as an example of rotary machines, but another type of rotary machines, such as an Interior Permanent Magnet Synchronous Motor, can be used. an induction motor can be used as an example of rotary machines set forth above.

Various types of rotary machines according to the present disclosure can be installed in various types of devices other than electric power steering systems. The control systems according to the present disclosure can be configured to control, as a controlled variable, the rotational speed of a rotary machine.

While illustrative embodiments of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A system for controlling a controlled variable of a rotary machine having plural-phase input terminals of the rotary machine in which plural-phase AC power is applied from an AC power applying module to the plural-phase input terminals, the system comprising:
    a command-voltage setting module configured to set, based on a request value for the controlled variable, plural-phase AC command voltages for the plural-phase AC power as a feedforward manipulated variable;
    a current obtaining module configured to obtain plural-phase AC currents flowing in the respective plural-phase input terminals of the rotary machine; and
    an amplitude correcting module configured to correct an amplitude of at least one of the plural-phase AC command voltages based on magnitudes of the plural-phase AC currents obtained by the current obtaining module,
    wherein the amplitude correcting module further comprises:
    a command-current calculating module configured to calculate plural-phase AC command currents for the plural-phase input terminals of the rotary machine as a function of the request value of the controlled variable; and a correction value calculating module configured to calculate a correction value that corrects the amplitude of the at least one of the plural-phase AC command voltages such that the magnitudes of the plural-phase AC currents match with those of the respective plural-phase AC command currents;

wherein the correction value calculating module further comprises:

a manipulated-variable calculating module configured to calculate a manipulated variable for the at least one of the plural-phase AC command voltages as a function of a deviation between a magnitude of each of the plural-phase AC currents and a magnitude of a corresponding one of the plural-phase AC command currents; and an adding module configured to add 1 to the manipulated variable for the at least one of the plural-phase AC command voltages, the amplitude correcting module further comprising:

a multiplying module configured to multiply the at least one of the plural-phase AC command voltages by a result of the addition by the adding module to thereby correct the amplitude of the at least one of the plural-phase AC command voltages.

2. The system according to claim 1, wherein correction value calculating module further comprises:

an absolute value calculating module configured to calculate an absolute value of each of the plural-phase AC currents as the magnitude thereof; and a deviation calculating module configured to calculate the deviation between the absolute value of each of the plural-phase AC currents and an absolute value of a corresponding one of the plural-phase AC command currents as the magnitude thereof, wherein the deviation between the absolute value of each of the plural-phase AC currents and that of a corresponding one of the plural-phase AC command currents is input to the manipulated-variable calculating module.

3. The system according to claim 1, further comprising:

a zero-cross timing detector configured to detect a zero-cross timing when each of the plural-phase AC currents crosses through zero; and a phase manipulating module configured to manipulate a phase of one or more of the plural-phase AC command voltages to thereby adjust a deviation between the detected zero-cross timing of each of the plural-phase AC currents and a zero-cross timing of a corresponding one of the plural-phase AC command currents to a target value.

4. The system according to claim 3, wherein:

the AC power applying module is designed as an inverter, the inverter comprising a switching element provided for each of the plural-phase input terminals, the switching element having a conductive path between a first end and a second end thereof, the inverter being configured to convert DC power to the AC power by turning on or off each of the switching elements, and the zero-cross timing detector is configured to:

obtain a polarity of a potential difference between the first and second ends of the conductive terminal of each of the switching elements to thereby determine whether a corresponding one of the plural-phase AC currents crosses through zero.

5. The system according to claim 3, wherein an absolute value of the target value is set to increase with an increase in a rotational speed of the rotary machine.

6. The system according to claim 1, wherein the AC power applying module is configured as an inverter, the inverter comprising a pair of first and second switching elements provided for each of the plural-phase input terminals, each of the first and second switching elements having a conductive path between a first end and a second end thereof, the inverter being configured to convert DC power to the AC power by alternatively turn on the first and second switching elements while an on duration of the first switching element is delayed by a dead time during which both the first and second switching elements are off, the system further comprising:

a polarity detecting module configured to detect a polarity of a potential difference between the first and second ends of the conductive terminal of each of the first switching elements; and a compensating module configured to correct, based on the detected polarity of the potential difference between the first and second ends of the conductive terminal of each of the first switching elements, a corresponding one of the plural-phase AC command voltages to compensate for the dead time of a corresponding one of the first switching elements.

7. The system according to claim 1, wherein the AC power applying module is designed as an inverter, the inverter comprising a pair of first and second switching elements provided for each of the plural-phase input terminals, the inverter being configured to convert DC power to the AC power by alternately turning on and off the first and second switching elements for each of the plural-phase input terminals, and wherein: the system further comprises a specifying module configured to specify which phase AC current in the plural-phase AC currents is obtained by the current obtaining module based on information representing one of on-off modes of the first and second switching elements provided for each of the plural-phase input terminals.

8. A system for controlling a controlled variable of a rotary machine having plural-phase input terminals of the rotary machine in which plural-phase AC power is applied from an AC power applying module to the plural-phase input terminals, the system comprising:

a command-voltage setting module configured to set, based on a request value for the controlled variable, plural-phase AC command voltages for the plural-phase AC power as a feedforward manipulated variable;

a current obtaining module configured to obtain plural-phase AC currents flowing in the respective plural-phase input terminals of the rotary machine; and an amplitude correcting module configured to correct an amplitude of at least one of the plural-phase AC command voltages based on magnitudes of the plural-phase AC currents obtained by the current obtaining module;

wherein the amplitude correcting module further comprises:

a command-current calculating module configured to calculate plural-phase AC command currents for the plural-phase input terminals of the rotary machine as a function of the request value of the controlled variable; and a correction value calculating module configured to calculate a correction value that corrects the amplitude of the at least one of the plural-phase AC command voltages such that the magnitudes of the plural-phase AC currents match with those of the respective plural-phase AC command currents;

wherein the system further comprises:

a zero-cross timing detector configured to detect a zero-cross timing when each of the plural-phase AC currents crosses through zero; and a phase manipulating module configured to manipulate a phase of one or more of the plural-phase AC command voltages to thereby adjust a deviation between the detected zero-cross timing of each of the plural-phase AC currents and a zero-cross timing of a corresponding one of the plural-phase AC command currents to a target value.

9. The system according to claim 8, wherein:

the AC power applying module is designed as an inverter, the inverter comprising a switching element provided for each of the plural-phase input terminals, the switching element having a conductive path between a first end and a second end thereof, the inverter being configured to convert DC power to the AC power by turning on or off each of the switching elements, and the zero-cross timing detector is configured to:

obtain a polarity of a potential difference between the first and second ends of the conductive terminal of each of the switching elements to thereby determine whether a corresponding one of the plural-phase AC currents crosses through zero.

10. The system according to claim 8, wherein an absolute value of the target value is set to increase with an increase in a rotational speed of the rotary machine.

11. The system according to claim 8, wherein the AC power applying module is configured as an inverter, the inverter comprising a pair of first and second switching elements provided for each of the plural-phase input terminals, each of the first and second switching elements having a conductive path between a first end and a second end thereof, the inverter being configured to convert DC power to the AC power by alternatively turn on the first and second switching elements while an on duration of the first switching element is delayed by a dead time during which both the first and second switching elements are off, the system further comprising:

a polarity detecting module configured to detect a polarity of a potential difference between the first and second ends of the conductive terminal of each of the first switching elements; and a compensating module configured to correct, based on the detected polarity of the potential difference between the first and second ends of the conductive terminal of each of the first switching elements, a corresponding one of the plural-phase AC command voltages to compensate for the dead time of a corresponding one of the first switching elements.

12. The system according to claim 8, wherein the AC power applying module is designed as an inverter, the inverter comprising a pair of first and second switching elements provided for each of the plural-phase input terminals, the inverter being configured to convert DC power to the AC power by alternately turning on and off the first and second switching elements for each of the plural-phase input terminals, and wherein: the system further comprises: a specifying module configured to specify which phase AC current in the plural-phase AC currents is obtained by the current obtaining module based on information representing one of on-off modes of the first and second switching elements provided for each of the plural-phase input terminals.

\* \* \* \* \*